United States Patent
Breault

(10) Patent No.: US 6,416,892 B1
(45) Date of Patent: Jul. 9, 2002

(54) INTERDIGITATED ENTHALLY EXCHANGE DEVICE FOR A FUEL CELL POWER PLANT

(75) Inventor: Richard D. Breault, North Kingstown, RI (US)

(73) Assignee: UTC Fuel Cells, LLC, South Windsor, CT (US)

( * ) Notice: Subject to any disclaimer, the term of this patent is extended or adjusted under 35 U.S.C. 154(b) by 62 days.

(21) Appl. No.: 09/627,989

(22) Filed: Jul. 28, 2000

(51) Int. Cl.⁷ ................................................. H01M 8/04
(52) U.S. Cl. .............................. 429/13; 429/20; 429/26; 429/34
(58) Field of Search .............................. 429/13, 20, 26, 429/34

(56) References Cited

U.S. PATENT DOCUMENTS

| 5,700,595 | A |  | 12/1997 | Reiser |
| 5,840,414 | A |  | 11/1998 | Bett et al. |
| 6,007,931 | A |  | 12/1999 | Fuller et al. |
| 6,120,923 | A | * | 9/2000 | Van Dine et al. ............. 429/17 |
| 6,274,259 | B1 | * | 8/2001 | Grasso et al. ................. 429/13 |

* cited by examiner

Primary Examiner—John S. Maples
(74) Attorney, Agent, or Firm—Malcolm J. Chisholm, Jr.

(57) ABSTRACT

An interdigitated enthalpy exchange device is disclosed for a fuel cell power plant that includes at least one fuel cell and a direct mass and heat transfer device secured in fluid communication with both an oxidant stream entering the fuel cell and an exhaust stream leaving the fuel cell. The direct mass and heat transfer device secures the interdigitated enthalpy exchange device in mass transfer relationship between the oxidant and exhaust streams. The device includes discontinuous oxidant entry and oxidant exit channels and discontinuous exhaust entry and exhaust exit channels, thereby providing for direct transfer of mass and heat from the exhaust stream to the oxidant stream while also restricting loss of liquid from the plant in the exhaust stream, filtering of dust entering the plant in the oxidant stream, and dampening of noise of the plant.

20 Claims, 4 Drawing Sheets

INTERDIGITATED ENTHALLY EXCHANGE DEVICE FOR A FUEL CELL POWER PLANT

TECHNICAL FIELD

The present invention relates to fuel cell power plants that are suited for usage in transportation vehicles, portable power plants, or as stationary power plants, and the invention especially relates to an interdigitated enthalpy exchange device for a fuel cell power plant that exchanges heat and water exiting the plant back into the plant to enhance water balance and energy efficiency of the plant.

BACKGROUND OF THE INVENTION

Fuel cell power plants are well-known and are commonly used to produce electrical energy from reducing and oxidizing fluids to power electrical apparatus such as apparatus on-board space vehicles, or on-site generators for buildings. In such power plants, a plurality of planar fuel cells are typically arranged in a stack surrounded by an electrically insulating frame structure that defines manifolds for directing flow of reducing, oxidant, coolant and product fluids. Each individual cell generally includes an anode electrode and a cathode electrode separated by an electrolyte. A reducing fluid such as hydrogen is supplied to the anode electrode, and an oxidant such as oxygen or air is supplied to the cathode electrode. In a cell utilizing a proton exchange membrane ("PEM") as the electrolyte, the hydrogen electrochemically reacts at a catalyst surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

The anode and cathode electrodes of such fuel cells are separated by different types of electrolytes depending on operating requirements and limitations of the working environment of the fuel cell. One such electrolyte is the aforesaid proton exchange membrane ("PEM") electrolyte, which consists of a solid polymer well-known in the art. Other common electrolytes used in fuel cells include phosphoric acid or potassium hydroxide held within a porous, non-conductive matrix between the anode and cathode electrodes. It has been found that PEM cells have substantial advantages over cells with liquid acid or alkaline electrolytes in satisfying specific operating parameters because the membrane of the PEM provides a barrier between the reducing fluid and oxidant that is more tolerant to pressure differentials than a liquid electrolyte held by capillary forces within a porous matrix. Additionally, the PEM electrolyte is fixed, and cannot be leached from the cell, and the membrane has a relatively stable capacity for water retention.

In operation of PEM fuel cells, it is critical that a proper water balance be maintained between a rate at which water is produced at the cathode electrode including water resulting from proton drag through the PEM electrolyte and rates at which water is removed from the cathode and at which water is supplied to the anode electrode. An operational limit on performance of a fuel cell is defined by an ability of the cell to maintain the water balance as electrical current drawn from the cell into the external load circuit varies and as an operating environment of the cell varies. For PEM fuel cells, if insufficient water is returned to the anode electrode, adjacent portions of the PEM electrolyte dry out thereby decreasing the rate at which hydrogen ions may be transferred through the PEM and also resulting in cross-over of the reducing fluid leading to local over heating. Similarly, if insufficient water is removed from the cathode, the cathode electrode may become flooded effectively limiting oxidant supply to the cathode and hence decreasing current flow. Additionally, if too much water is removed from the cathode, the PEM may dry out limiting ability of hydrogen ions to pass through the PEM, thus decreasing cell performance.

As fuel cells have been integrated into power plants developed to power transportation vehicles such as automobiles, trucks, buses, etc., maintaining a water balance within the power plant has become a greater challenge because of a variety of factors. For example, with a stationary fuel cell power plant, water lost from the plant may be replaced by water supplied to the plant from off-plant sources. With a transportation vehicle, however, to minimize fuel cell power plant weight and space requirements, the plant must be self-sufficient in water to be viable. Self-sufficiency in water means that enough water must be retained within the plant to offset water losses from gaseous streams of reactant fluids passing through the plant. For example, any water exiting the plant through a cathode exhaust stream of gaseous oxidant or through an anode exhaust stream of gaseous reducing fluid must be balanced by water produced electrochemically at the cathode and retained within the plant.

An additional requirement for maintaining water self-sufficiency in fuel cell power plants is associated with components necessary to process hydrocarbon fuels, such as methane, natural gas, gasoline, methanol, diesel fuel, etc., into an appropriate reducing fluid that provides a hydrogen rich fluid to the anode electrode. Such fuel processing components of a fuel cell power plant typically include a boiler that generates steam; a steam line that directs the steam from the boiler; and a reformer that receives the steam and a hydrocarbon fuel mixture along with a small amount of a process oxidant such as air and transforms the mixture into a hydrogen-enriched reducing fluid appropriate for delivery to the anode electrode of the fuel cell. The fuel processing components include water requirements that are part of an overall water balance of the fuel cell power plant. For example, water made into steam in the boiler must be replaced by water recovered from the plant.

It is known to use a direct mass and heat transfer device to enhance water balance of a fuel cell power plant, such as disclosed in U.S. Pat. No. 6,007,931 that issued on Dec. 28, 1999 to Fuller et al., and is owned by the assignee of all rights in the interdigitated enthalpy exchange device invention disclosed herein, and which Patent is hereby incorporated herein by reference. The direct mass and heat transfer device passes the process oxidant stream upstream of the fuel cell in mass transfer relationship with the plant exhaust stream exiting the plant so that mass and heat such as water vapor and entrained liquid water in the exhaust stream pass directly through a mass transfer medium into the process oxidant stream to heat and humidify the oxidant stream without the complexities of traditional condensing heat exchangers. Therefore the Fuller et al. mass and heat recovery system substantially enhances water recovery and plant energy efficiency because the recovered water and heat need no parasite power from the fuel cell to pump or otherwise transfer the mass and heat to humidify and heat the process oxidant stream.

Another difficulty associated with fuel cell power plants utilized to power transportation vehicles involves a coolant system necessary to maintain the fuel cell within an appropriate heat range. Heat must be removed from the fuel cell, and it is common to cycle a cooling fluid through cooler plates adjacent reactant stream flow fields of the fuel cell. Such cooling fluids must also be tolerant of temperature extremes to which transportation vehicles are exposed, and therefore the cooling fluids consist of various antifreeze solutions as is well known. However, as a cooling fluid contacts cell components, especially where fuel processing components have supplied a reformate fuel to the fuel cell, it is also known that the cooling fluid will be contaminated with dissolved gases, such as ammonia ($NH_3$), hydrogen ($H_2$), as well as carbon dioxide ($CO_2$). Additionally, it is known that dissolved metals and other ions must be removed in order to limit conductivity of the coolant fluid to avoid shunt current corrosion. Therefore it is known to use cooling fluid treatment systems within a fuel cell power plant, such as a degasifier to strip dissolved or dissociated contaminants within the cooling fluid, and a demineralizer to remove dissolved metals, such as shown in U.S. Pat. No. 4,344,850 to Grasso, which patent is also owned by the assignee of all rights in the interdigitated enthalpy exchange device invention disclosed herein.

It has more recently been discovered that the direct mass and heat transfer system and a coolant fluid treatment system may be functionally integrated as disclosed in U.S. patent application Ser. No. 09/544,103 entitled, "Functional Integration of Multiple Components For a Fuel Cell Power Plant", which U.S. Patent Application is commonly owned by the assignee of all rights in the interdigitated enthalpy exchange device invention disclosed herein, and which Patent Application is hereby incorporated herein by reference. As disclosed in that Application, a housing supports a mass transfer device in mass transfer relationship between the process oxidant stream entering the fuel cell and a plant exhaust stream exiting the plant, and the housing also includes a degasifier and a cooling fluid accumulator. Consequently, a separate cooling fluid degasifier is not necessary. The housing also receives heated gases from an anode exhaust burner associated with fuel processing components so that the mass transfer device also transfers water and heat from the burner exhaust gas. The degasifier may be any known mass transfer device capable of effecting mass transfer between a liquid and a gaseous stream, such as a packed bed, a wetted film, a spray tower, etc.

While the functional integration of various fuel cell power plant components has increased efficiency of the power plant, the structure of the housing integrating the direct mass and heat transfer device with the degasifier and coolant accumulator has given rise to an additional difficulty. In particular, to effect appropriate decontamination of the coolant fluid, the housing includes an upper portion or splash plate that causes vigorous splashing and turbulence of the cooling fluid within the housing prior to the cooling fluid passing through a degasifier material, such as a packed bed. Additionally, the plant exhaust also passes through the degasifier with the cooling fluid before passing over an exhaust surface of the mass transfer medium. Consequently a substantial portion of the cooling fluid may thereby pass as entrained liquid with the plant exhaust stream into and through the mass transfer device, resulting in an unacceptable loss of cooling fluid from the power plant.

Another problem associated with use of fuel cell power plants in transportation vehicles is contamination of power plant components by fine dust particles common to roadways upon which vehicles travel. Efficient fuel cell power plant design limits parasite power from the fuel cell to pump the process oxidant stream through fine particle filters. However, use of the aforesaid direct mass and heat transfer system to directly transfer heat and water into an ambient pressure process oxidant stream raises a risk of fine dust contamination of the transfer medium, fuel cell electrolyte and other plant components. A further difficulty of fuel cell power plants in transportation vehicles is limiting sound of the plant to an acceptable level. In known fuel cell power plants, such as that described in the aforesaid, commonly owned, U.S. Patent to Fuller et al., a blower is located on an oxidant inlet that directs the process oxidant stream into the fuel cell. Locating the blower between the direct mass and heat transfer device and the fuel cell enables the mass and heat transfer device to limit the noise of the blower, however a greater noise reduction is desirable.

Accordingly, there is a need for an improvement to known fuel cell power plants that provides for enhanced water retention in a functionally integrated direct mass and heat transfer device; that provides for enhanced filtration of fine dust particles within the process oxidant stream entering the fuel cell; and, that provides for further sound reduction of a blower that blows the oxidant stream into the fuel cell.

DISCLOSURE OF THE INVENTION

The invention is an interdigitated enthalpy exchange device for a fuel cell power plant that generates electrical energy from process oxidant and reducing fluid reactant streams. The power plant includes at least one fuel cell for producing electricity from the process oxidant and reducing fluid streams, and a direct mass and heat transfer device secured in fluid communication with both an oxidant inlet line that directs the process exhaust stream into the fuel cell and with a plant exhaust passage that directs a plant exhaust stream out of the power plant. The direct mass and heat transfer device includes a structure that secures the interdigitated fine pore enthalpy exchange device in mass transfer relationship between the process oxidant and plant exhaust streams.

The interdigitated enthalpy exchange device includes a fine pore process oxidant body having a process oxidant barrier surface opposed to an interdigitated process oxidant surface including at least one process oxidant entry channel defined in the interdigitated process oxidant surface that is in fluid communication with the process oxidant stream entering the fuel cell and that is discontinuous with at least one process oxidant exit channel defined within the interdigitated process oxidant surface so that a process oxidant barrier wall is defined between the process oxidant entry and exit channels. A process oxidant large pore media is secured adjacent the interdigitated process oxidant surface and overlies the entry and exit channels so that the oxidant stream passes from the process oxidant entry channel through the process oxidant large pore media and into the process oxidant exit channel that is in fluid communication with an oxidant inlet line extension directing the oxidant stream into the fuel cell. The interdigitated enthalpy exchange device also includes a fine pore exhaust body having an exhaust barrier surface opposed to an interdigitated exhaust surface including at least one exhaust entry channel defined within the exhaust surface that is in fluid communication with the exhaust passage and that is discontinuous with at least one exhaust exit channel so that an exhaust barrier wall is defined between the exhaust entry and exit channels. An exhaust large pore media is secured adjacent the exhaust surface and overlies the exhaust entry and exit channels so that the process exhaust stream passes from the exhaust entry channel through the exhaust large pore media into the exhaust exit channel that is in fluid communication with a plant exhaust vent. The exhaust barrier surface of the fine pore exhaust body is secured adjacent the process oxidant large pore media so that mass and heat, such as heated water vapor and entrained liquid water, within the plant exhaust stream passing through the exhaust entry and exit channels passes through the fine pore exhaust body and its exhaust barrier surface and into the process oxidant large pore media to enter the process oxidant stream passing through the process oxidant entry channel, the process oxidant large pore media and the process oxidant exit channel to humidify and heat the process oxidant stream entering the fuel cell.

The process oxidant and exhaust fine pore bodies include a support matrix that defines pores and a liquid transfer medium that fills the pores creating a gas barrier. In a preferred embodiment, the support matrix of the process oxidant and exhaust bodies defines pores having a pore-size range of less than 20 microns; the matrix is hydrophilic so that it is capable of being wetted by the liquid transfer medium resulting in a bubble pressure that is greater than 0.2 pounds per square inch ("p.s.i."); and, the matrix is chemically stable in the presence of the liquid transfer medium.

Exemplary support matrixes include rigid, porous, graphite layers; rigid, porous, graphite-polymer layers; rigid, inorganic-fiber thermoset polymer layers; glass fiber layers; synthetic-fiber filter papers treated to be wettable; porous metal layers; perforated metal layers wherein such perforations may include particulate matter secured within the perforations defining an acceptable fine pore-size range; and a plurality of differing layers of those support matrixes. Preferably the support matrix has a high thermal conductivity to help transfer heat from the exhaust stream to an ambient air process oxidant stream to thereby minimize freezing within the oxidant inlet when operating at very low ambient temperatures. The liquid transfer medium may include water, and organic antifreeze water solutions, wherein the liquid transfer medium is capable of sorbing a fluid substance consisting of polar molecules such as water from a fluid stream consisting of polar and non-polar molecules.

The process oxidant and exhaust large pore media may be a carbon paper, such as a porous carbon-carbon fibrous composite having approximately sixty-five to seventy-five percent porosity and a mean pore diameter of greater than 20 microns, and the carbon paper may be wetproofed.

In an additional preferred embodiment, the direct mass and heat transfer device may be integrated with a power plant coolant stream to de-gasify the coolant stream and with a combusted anode exhaust stream to transfer moisture and heat from the combusted anode exhaust stream to the process oxidant stream entering the fuel cell. The coolant stream may also be used to replenish the liquid transfer medium of the interdigitated enthalpy exchange device.

In operation of the interdigitated enthalpy exchange device for a fuel cell power plant, as the plant exhaust stream passes through the exhaust entry channel, exhaust large pore media and exhaust exit channel, moisture and heat pass from the plant exhaust stream through a liquid transfer medium held within the fine pore exhaust body and its exhaust barrier wall into the process oxidant stream passing though the process oxidant entry channel, the process oxidant large pore media and the process oxidant exit channel. Because the exhaust entry and exit channels are discontinuous and separated by the exhaust barrier wall, most liquid moisture within the plant exhaust stream remains within the exhaust entry channel and will not pass through the exhaust barrier wall defined in the fine pore exhaust body. Thus, the liquid water will not pass with the gaseous process exhaust stream passing into the exhaust exit channels and plant exhaust vent to leave the plant. Additionally, the process oxidant entry and exhaust channels in the interdigitated process oxidant surface also serve to filter fine dust particles within the process oxidant stream, and to suppress noise of a blower located between the direct mass and heat transfer device and the fuel cell that could pass along the process oxidant stream and out of the plant.

Accordingly, it is a general object of the present invention to provide an interdigitated enthalpy exchange device for a fuel cell power plant that overcomes deficiencies of prior art fuel cell power plants.

It is a more specific object to provide an interdigitated enthalpy exchange device for a fuel cell power plant that transfers heat and water vapor from a plant exhaust stream leaving the plant directly into a process oxidant stream entering the plant.

It is yet another object to provide an interdigitated enthalpy exchange device for a fuel cell power plant that restricts movement of liquid water out of the plant.

It is still a further object to provide an interdigitated enthalpy exchange device for a fuel cell power plant that suppresses noise of the power plant.

It is another specific object to provide an interdigitated enthalpy exchange device for a fuel cell power plant that filters fine dust particles within the process oxidant stream entering a fuel cell of the power plant.

It is a further specific object to provide an interdigitated enthalpy exchange device for a fuel cell power plant that is integrated with a cooling fluid degasifier and accumulator.

These and other objects and advantages of this invention will become more readily apparent when the following description is read in conjunction with the accompanying drawings.

DESCRIPTION OF THE PREFERRED EMBODIMENTS

Figure 1:
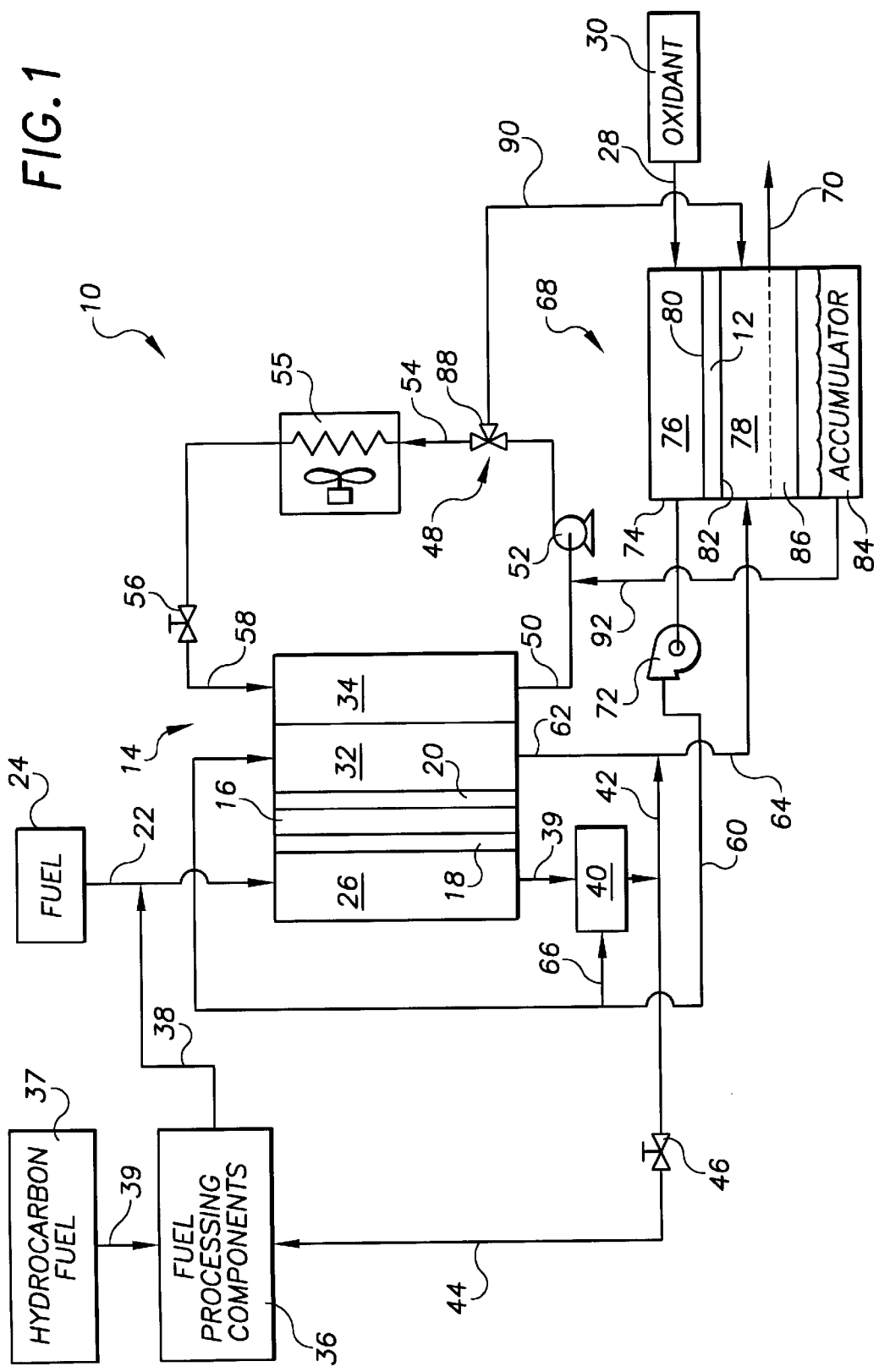
FIG. 1 is a schematic representation of a fuel cell power plant utilizing an interdigitated enthalpy exchange device within a mass and heat transfer device of the plant constructed in accordance with the present invention.

Referring to the drawings in detail, a fuel cell power plant is shown schematically in FIG. 1 and generally designated by reference numeral 10 as an appropriate working environment for an interdigitated enthalpy exchange device 12 of the present invention. The fuel cell power plant 10 includes at least one fuel cell means for producing electrical energy from a reducing fluid and an oxidant stream, such as a fuel cell 14. The fuel cell 14 has an electrolyte 16 such as a proton exchange membrane ("PEM"), an anode electrode 18 and a cathode electrode 20 on opposed sides of the electrolyte 16. The fuel cell 14 may be combined with other virtually identical fuel cells (not shown) in a well-known manner to form a cell stack assembly enclosed within a frame (not shown) that defines manifolds for directing reducing fluid and process oxidant reactant streams into and out of the fuel cell 14 in a manner well-known in the art. A reducing fluid inlet 22 directs a hydrogen rich reducing fluid fuel stored in a fuel supply 24 (labeled "FUEL" in FIG. 1 to facilitate understanding) into the cell 14 so that the reducing fluid passes through an anode flow field 26 defined adjacent the anode electrode 18. Similarly, an oxidant inlet line 28 directs an oxidant stream such as air from an oxidant supply 30 (labeled "OXIDANT" in FIG. 1) into the cell 14 through oxidant manifolding (not shown, but well-known in the art) so that the oxidant passes through a cathode flow field 32 defined adjacent the cathode electrode 20.

The fuel cell 14 may also include a coolant plate means for removing heat from the fuel cell 12, wherein the coolant plate means may be a porous or sealed coolant plate 34 adjacent the cathode flow field 32. A sealed coolant plate means that a cooling fluid in, or passing through the sealed coolant plate 34 cannot pass into the cathode flow field 32, or an anode flow field of an adjacent second fuel cell (not shown). By describing the coolant plate 34 as porous, in contrast, it is meant that a cooling fluid in, or passing through the coolant plate may pass into the cathode flow field 32 and/or anode flow field 26, and that water within the anode or cathode flow fields 26, 32 may move into the porous coolant plate 34. The anode and cathode flow fields 26, 32 may be cavities defined adjacent the anode and cathode electrodes 18, 20 by a frame, or they may consist of a plurality of small passages, channels, or pores defined within porous or channeled graphite, carbon or metal sheets, as is common in the art. The fuel cell 14 also includes common electrical conduction means for directing an electrical current generated by the fuel cell out of the cell 14 to an electricity using device (not shown), such as through a standard external load circuit (not shown).

The fuel cell power plant 10 may also include fuel processing component means 36 for processing hydrocarbon fuels into reducing fluids appropriate for providing fuel to an anode electrode of a fuel cell, such as described in the aforesaid U.S. Pat. No. 6,007,931 to Fuller et al. A hydrocarbon fuel may be delivered from a hydrocarbon fuel supply 37 through a hydrocarbon fuel delivery line 39 to the fuel processing component means 36. The fuel processing component means 36 may direct a hydrogen rich reformate fuel through a reformate line 38 into the reducing fuel inlet 22, or alternatively, the fuel cell may receive an appropriate fuel, such as pure hydrogen gas, directly from the fuel storage supply 24. Any unused hydrogen in an anode exhaust stream passing out of the anode flow field 26 within an anode exhaust passage 39 is combusted within a burner 40 to thereby heat the anode exhaust stream leaving the burner 40 within a combusted anode exhaust line 42 and to render the anode exhaust stream leaving the burner 40 non-flammable. A fuel processing component combusted anode exhaust supply line 44 may be secured between the combusted anode exhaust line 42 or the burner 40 to selectively pass through a supply valve 46 combusted anode exhaust to the fuel processing component means 36 for generating steam, and/or providing water, as is well known.

The fuel cell power plant 10 may include coolant means for cooling the cell during operation, and for supplying a cooling fluid to the cell and/or for removing product water from the cell, such as a coolant loop 48. The coolant loop 48 may include the coolant plate means 34 secured adjacent the cathode flow field 32 for passing a cooling fluid through the cell 14; a coolant return line 50 that directs the cooling fluid from the coolant plate 34 to a coolant pump 52, which pumps the coolant fluid through the coolant loop 48; and, a coolant feed line 54 that directs the cooling fluid from the coolant pump 52 through a coolant heat exchanger 55 back into the coolant plate 34 within the fuel cell 14. The coolant heat exchanger 55 serves to cool the coolant fluid passing through the exchanger 55 such as by passing ambient air through the exchanger 55, or by other heat exchange means well-known in the art. In ordinary operation of the fuel cell 14 utilizing a porous coolant plate means 34, product water is generated at the cathode electrode, and may be removed from the cell within the coolant return line 50.

The coolant loop 48 may also include a pressure control means for maintaining a positive pressure differential between the reactant streams passing through the anode and cathode flow fields 26, 32 and the cooling fluid passing through the cooler plate 34. The pressure control means may include the coolant pump 52 coordinated with a pressure control valve means for maintaining a specific pressure of the cooling fluid within a first extension 58 of the coolant feed line 54 down stream of the valve means, cooler plate 34 and coolant return line 50, such as a pressure control valve 56 secured between the coolant pump 52 and the cooler plate 34, such as on the coolant feed line 54. As is well-known, the pressure control valve 56 may be set manually, automatically, or, for example, may be electro-mechanically adjusted based upon a reference pressure within the process oxidant stream within the cathode flow field 32 to restrict flow through the valve 56 so that the stream of cooling fluid drawn into the coolant pump 42 from the coolant feed line 54, cooler plate 34, and coolant return line 50 is at a pressure lower than the pressure of the process oxidant stream within the cathode flow field 32. Additional pressure control means for purposes herein may include any well-known mechanism that can reduce pressure of a liquid stream below a reference pressure of a gaseous stream, such as disclosed in U.S. Pat. No. 5,700,595, issued on Dec. 23, 1997 to Reiser and assigned to the assignee of the present invention, which patent is hereby incorporated herein by reference.

As shown in FIG. 1, the oxidant is supplied from the oxidant supply 30 to the cathode flow field 32 within the oxidant inlet line 28, and a first extension of the oxidant inlet line 60. After passing through the cathode flow field, the oxidant and product water formed at the cathode electrode 20 in the form of water vapor and entrained liquid droplets move out of the fuel cell 14 as a cathode exhaust stream within a cathode exhaust passage 62, and the cathode exhaust passage directs the cathode exhaust stream into a plant exhaust passage 64, wherein the combusted anode exhaust stream may be mixed with the cathode exhaust stream to become a plant exhaust stream. A second extension 66 of the oxidant inlet 28 may direct a portion of the oxidant stream from the first extension 60 into the burner 40 to support combustion of the unused hydrogen.

The plant exhaust passage 64 directs the plant exhaust stream into a direct mass and heat transfer device means for directly transferring mass from a first fluid stream passing through the device to a second fluid stream passing through the device, such as a direct mass and heat transfer device 68. The direct mass and heat transfer device 68 is secured in fluid communication with both the plant exhaust passage 64, and the oxidant inlet line 28. The plant exhaust passage 64 directs the plant exhaust stream into the mass and heat transfer device 68, and a plant exhaust vent 70 directs the plant exhaust stream out of the device 68 and out of the fuel cell power plant 10. The first extension 60 of the oxidant inlet 28 directs the process oxidant stream from the mass and heat transfer device 68 to cathode flow field 32 of the fuel cell 14. An oxidant blower 72 may also be positioned on the first extension 60 of the oxidant inlet line 28 to variably accelerate flow of gaseous oxidant into the fuel cell 14, as shown in FIG. 1.

The mass and heat transfer device 68 includes a structure or housing 74 that defines an oxidant chamber 76 through which the process oxidant stream passes, and an exhaust chamber 78 through which the exhaust stream passes. The housing 74 also secures the interdigitated enthalpy exchange device 12 in mass transfer relationship between the oxidant and exhaust chambers 76, 78 so that the process oxidant stream within the oxidant chamber 76 passes adjacent an interdigitated process oxidant surface 80 of the device and the plant exhaust stream within the exhaust chamber 78 passes adjacent an interdigitated exhaust surface 82, and the housing 74 secures the interdigitated enthalpy exchange device 12 as a barrier between the process oxidant and exhaust streams (shown schematically in FIG. 1) to prevent bulk mixing of the streams.

In a preferred embodiment, shown schematically in FIG. 1, the direct mass and heat transfer device may be functionally integrated with the coolant loop 48 so that the housing 74 also includes a coolant accumulator chamber 84 that may be at least partially filled with a mass transfer material to serve as a degasifier 86 means for stripping contaminants from the coolant stream passing in mass transfer relationship with the degasifier 86, wherein the coolant stream within the accumulator chamber 84 is in fluid communication with the degasifier 86. In such an embodiment, the cooling fluid may be directed from the coolant loop 48 by a coolant diversion three way valve 88 secured between the coolant feed line 52 and a coolant diversion line 90 that selectively directs a portion of the coolant fluid to the coolant accumulator chamber 84 and degasifier 86. A coolant accumulator delivery line 92 may be secured between the accumulator chamber 84 and the coolant loop 48, such as at the coolant return line 40, to direct degasified cooling fluid back to the coolant loop 48.

Figure 2:
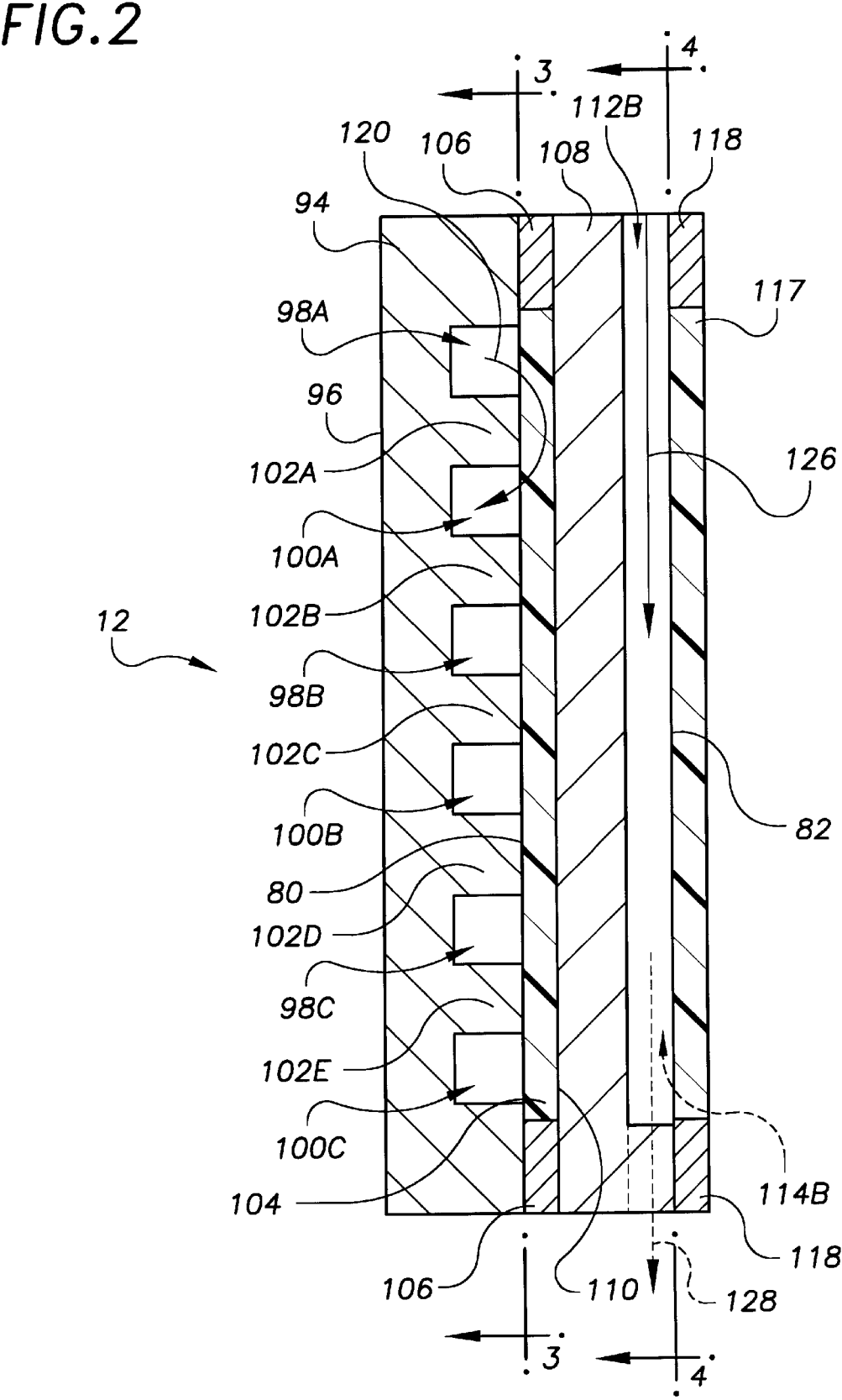
FIG. 2 is a cross-sectional, schematic representation of an interdigitated enthalpy exchange device for a fuel cell power plant.

As shown in FIG. 2, a first embodiment of the interdigitated enthalpy exchange device 12 includes a fine pore process oxidant body 94 having a process oxidant barrier surface 96 opposed to the interdigitated process oxidant surface 80. The interdigitated process oxidant surface 80 shown in FIG. 2 includes a plurality of process oxidant entry channels, such as three process oxidant entry channels 98A, 98B, 98C shown in both FIGS. 2 and 3, although the invention includes embodiments of the process oxidant surface 80 having one or more process oxidant entry channels. The process oxidant entry channels 98A, 98B, 98C are in fluid communication through manifolding means known in the art (not shown) with the oxidant inlet line 28 and hence with the process oxidant stream passing through the oxidant inlet 28. The interdigitated process oxidant surface 80 also includes a plurality of process oxidant exit channels 100A, 100B, 100C as shown in both FIGS. 2 and 3. The invention however may include one or more process oxidant exit channels. As is clear from FIG. 3, the process oxidant entry channels 98A, 98B, 98C are discontinuous with the process oxidant exit channels 100A, 100B, 100C, meaning that a plurality of process oxidant barrier walls 102A, 102B, 102C, 102D, 102E are defined in the interdigitated process oxidant surface 80 between the process oxidant entry 98A, 98B, 98C and process oxidant exit 100A, 100B, 100C channels to interrupt direct gaseous flow between the process oxidant entry and process oxidant exit channels. A process oxidant large pore media 104 (shown only in FIG. 2) is secured adjacent to the interdigitated process oxidant surface 80 and is dimensioned to overlie the process oxidant entry and exit channels 98A, 98B, 98C, 100A, 100B, 100C so that gaseous components of the process oxidant stream passing through the process oxidant entry channels 98A, 98B, 98C must pass through the process oxidant large pore media 104 to pass into the process oxidant exit channels 100A, 100B, 100C. The process oxidant large pore media 104 may include a process oxidant edge seal 106 that surrounds a perimeter of media 104 to restrict movement of the process oxidant stream through the perimeter of the process oxidant large pore media 104 and thereby out of the process oxidant fine pore body 94. The process oxidant fine pore body 94 is saturated with liquid during operation which forms a seal that prevents leakage of the process oxidant stream. The process oxidant exit channels 100A, 100B, 100C are in fluid communication with the first extension 60 of the oxidant inlet 28, and therefore the process oxidant stream leaving the process oxidant exit channels 100A, 100B, 100C, passes through the first extension 60 of the oxidant inlet line 28 into the cathode flow field 32 of the fuel cell 14.

Figure 4:
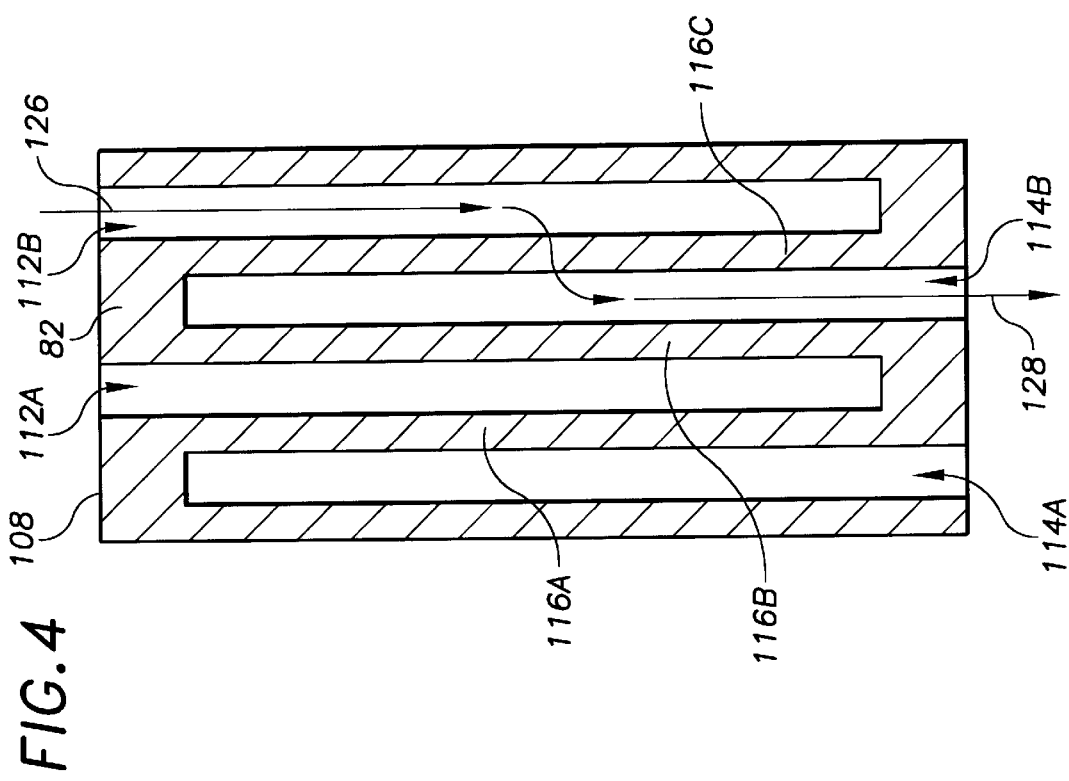
FIG. 4 is a cross-sectional, schematic representation of the FIG. 2 interdigitated enthalpy exchange device shown along view lines 4—4 of FIG. 2.

The interdigitated enthalpy exchange device 12 also includes a fine pore exhaust body 108 having an exhaust barrier surface 110 opposed to the interdigitated exhaust surface 82. The interdigitated exhaust surface 82 shown in FIG. 4 includes a plurality of exhaust entry channels, such as two exhaust entry channels 112A, 112B (112A and 112B being shown in FIG. 4, and 112B being shown in FIG. 2), and the invention includes embodiments of the interdigitated exhaust surface 82 having one or more exhaust entry channels. The exhaust entry channels 112A, 112B are in fluid communication with the plant exhaust passage 64 and hence with the plant exhaust stream (including the cathode exhaust stream, the combusted anode exhaust stream, or both mixed together) passing through the plant exhaust passage 64. The interdigitated exhaust surface 82 also includes a plurality of exhaust exit channels 114A, 114B as shown in FIG. 4. The exhaust entry channels 112A, 112B are discontinuous with the exhaust exit channels 114A, 114B, meaning that a plurality of exhaust barrier walls 116A, 116B, 116C are defined in the interdigitated exhaust surface 82 between the exhaust entry channels 112A, 112B and the exhaust exit channels 114A, 114B to interrupt direct gaseous flow between the exhaust entry and exit channels 112A, 112B, 114A, 114B. An exhaust large pore media 117 (shown in FIG. 2) is secured adjacent the interdigitated exhaust surface 82 and is dimensioned to overlie the exhaust entry and exit channels 112A, 112B, 114A, 114B so that gaseous components of the plant exhaust stream passing through the exhaust entry channels 112A, 112B must pass through the exhaust large pore media 117 to pass into the exhaust exit channels 114A, 114B. The exhaust large pore media 117 may include an exhaust edge seal 118 that surrounds a perimeter of the exhaust large pore media 117 to restrict movement of the plant exhaust stream through the perimeter of the exhaust large pore media 117 and out of the fine pore exhaust body 108. The exhaust fine pore body 108 is saturated with liquid during operation which forms a wet seal that prevents leakage of the process exhaust stream. The exhaust exit channels 114A, 114B are in fluid communication with the plant exhaust vent 70 so that the process exhaust stream passing out of the exhaust exit channels 114A, 114B passes through the plant vent 70 and out of the plant 10.

Figure 3:
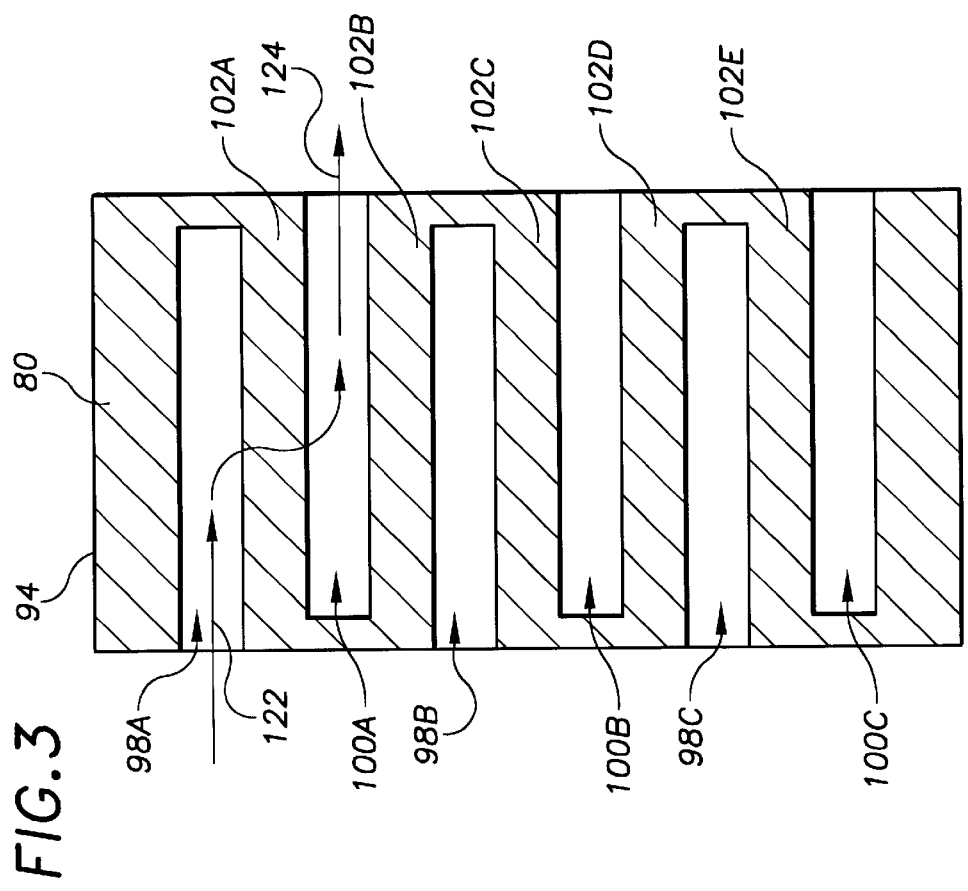
FIG. 3 is a cross-sectional, schematic representation of the FIG. 2 interdigitated enthalpy exchange device shown along view lines 3—3 of FIG. 2.

To assist in understanding flow of the process oxidant stream and plant exhaust stream through the interdigitated enthalpy exchange device, flow arrows are included in FIGS. 2–4. A first process oxidant flow arrow 120 in FIG. 2 shows a flow path for the process oxidant stream from the process oxidant entry channel 98A through the process oxidant large pore media 104, and into the process oxidant exit channel 100A. Similarly, in the different orientation of FIG. 3, second and third process oxidant flow arrows 122, 124 show process oxidant stream flow through the process oxidant entry channel 98A and process oxidant exit channel 100A. A first exhaust flow arrow 126, shown in FIGS. 2 and 4, shows flow of the plant exhaust stream into and through an exhaust entry channel 112B, and a second exhaust flow arrow 128 (shown as a hatched arrow in FIG. 2) shows flow of the plant exhaust stream through an exhaust exit channel 114B.

FIG. 2 shows the fine pore exhaust body 108 positioned so that its exhaust barrier surface 110 is secured adjacent the process oxidant large pore media 104. It is also anticipated that in specific embodiments it may be desirable to employ the interdigitated enthalpy exchange device 12 with only the process oxidant surface 80 or the exhaust surface 82 in an interdigitated arrangement with a cooperating large pore media, depending upon particular requirements of varying work environments. Therefore, to describe such alternative embodiments as only one of the process oxidant or exhaust surfaces 80, 82 being interdigitated with a cooperating large pore media, or in the above-described relative positions of the fine pore process oxidant and exhaust bodies 94, 108, the invention will be characterized as an interdigitated enthalpy exchange device means 12 for transferring mass and heat between process oxidant and plant exhaust streams passing adjacent opposed process oxidant and exhaust surfaces of the device.

The fine pore process oxidant body 94 and the fine pore exhaust body 108 include a support matrix means for defining pores for supporting a liquid transfer medium that fills the pores to create a gas barrier. The support matrix preferably defines pores having a pore-size range of less than 20 microns that results in the fine pore process oxidant body 94 and fine pore exhaust body 108 having a bubble pressure of greater than 0.2 pounds per square inch ("p.s.i.") when the pores are wetted by the liquid transfer medium, and the support matrix is chemically stable in the presence of the liquid transfer medium. The bubble pressure requirement of the support matrix is dictated by the specific design of the fuel cell power plant 10 and the direct the mass and heat transfer device 68 which sets a maximum pressure differential between the exhaust stream within the exhaust chamber 78 and plant exhaust passage 64 and the process oxidant stream within the oxidant chamber 76 and the oxidant inlet line 28. There is a trade-off between bubble pressure and liquid permeability, and the minimum bubble pressure necessary to allow maximum liquid permeability is utilized. Within the direct mass and heat transfer device 68, movement of the water and heat from the plant exhaust stream through the interdigitated enthalpy exchange device into the process oxidant inlet stream is driven by a difference in a partial pressure of the water molecules within the plant exhaust stream and a partial pressure of water molecules within the process oxidant inlet stream, and by a difference in temperatures between the two streams within the transfer device 68.

Exemplary support matrix means that make up the solid portions of the fine pore process oxidant body 94 and fine pore exhaust body 108 include porous graphite layers; porous, graphite-polymer layers; inorganic-fiber thermoset polymer layers; glass fiber layers; synthetic-fiber filter papers treated to be wettable; porous metal layers; perforated metal layers wherein such perforations include particulate matter secured within the perforations and defining an acceptable fine pore-size range; and a plurality of, differing layers of those support matrixes. The materials that may form support matrixes of this invention may be made hydrophilic by standard treatments well-known in the art with hydrophilic compounds, such as disclosed and described in U.S. Pat. No. 5,840,414, which Patent is owned by the assignee of all rights in the present invention and which Patent is incorporated herein by reference. Other materials capable of forming porous gas seals known in the art may also serve as a support matrix means, provided the materials can define hydrophilic pores having a pore-size range of less than 20 microns that results in a gas barrier having a bubble pressure of greater than 0.2 p.s.i. when the hydrophilic pores are wetted by the liquid transfer medium, and the materials are chemically stable in the presence of a liquid transfer medium within the pores of the fine pore process oxidant and exhaust bodies 94, 108. The process oxidant large pore media 104 and the exhaust large pore media 117 may be formed of a carbon paper, such as a porous carbon-carbon fibrous composite having approximately sixty-five to seventy-five percent porosity and a mean pore diameter of greater than 20 microns, and the carbon paper may be wetproofed in a manner well known in the art to make the paper hydrophobic. An exemplary carbon paper is a porous carbon material sold under the brand name "GRADE TGP-H-060" by the Toray Company of New York, N.Y., U.S.A.

The liquid transfer medium may include water, and organic antifreeze-water solutions, wherein the transfer medium is capable of sorbing a fluid substance consisting of polar molecules such as water from a fluid stream consisting of polar and non-polar molecules. Preferred liquid transfer media include: a. a 45 to 85 weight per cent ethylene glycol water solution; b. a 45 to 85 weight per cent propylene glycol solution; c. a 45 to 80 weight per cent glycerol water solution, so that the liquid transfer media have a freezing point less than 0 degrees Fahrenheit (hereafter "°F."). Glycerol is especially preferred as the liquid transfer medium because it has both satisfactory freezing point depression and low vapor pressure characteristics at a working concentration. That low vapor pressure results in low loss rates of the liquid transfer medium out of the enthalpy exchange device 12 during operation of the fuel cell power plant 10, and hence low amounts of the transfer medium in any plant emissions. Additionally, the quantity of antifreeze that is carried into the fuel cell with the process air is very low which mitigates poisoning of the cell.

By characterizing the support matrix making up the fine pore process oxidant and exhaust bodies 94, 108 of the interdigitated enthalpy exchange device 12 as chemically stable in the presence of the liquid transfer medium, it is meant that intimate, prolonged contact between the aforesaid concentrations of the varying liquid transfer media will not degrade the support matrix so that it cannot perform its role of supporting the transfer medium to form a gas barrier between the interdigitated process oxidant and exhaust surfaces 80, 82 of the interdigitated enthalpy exchange device 12. By characterizing the support matrix as having a pore-size range of less than 20 microns that results in the device 12 having a bubble pressure of greater than 0.2 pounds per square inch ("p.s.i.") when the pores are wetted by the liquid transfer medium, it is meant that the pores defined by the support matrix have diameters that are less than 20 microns and that whenever the pores are wetted by the liquid transfer medium a pressure differential between the opposed interdigitated process oxidant surface 80 and interdigitated exhaust surface 82 of 0.2 p.s.i. or less will not result in gas movement through the interdigitated enthalpy exchange device 12.

A similar enthalpy exchange device, but not having interdigitated process oxidant or exhaust surfaces, and described in similar but not identical working environments is disclosed in U.S. Pat. No. 6,274,259 B1, entitled "Fine Pore Enthalpy Exchange Barrier", which Patent is owned by the owner of all rights in invention described herein, and which Patent is hereby incorporated herein by reference.

It is pointed out that while potential alternative porous gas seal structures such as ionomer or polymer films could also transport water and heat, they are known to be quite expensive, and may not be chemically stable in the presence of a wide variety of liquid transfer media necessary to facilitate efficient operation of fuel cell power plants in climates varying from sub-freezing to hot, dry ambient conditions, such as experienced by modern transportation vehicles.

Figure 5:
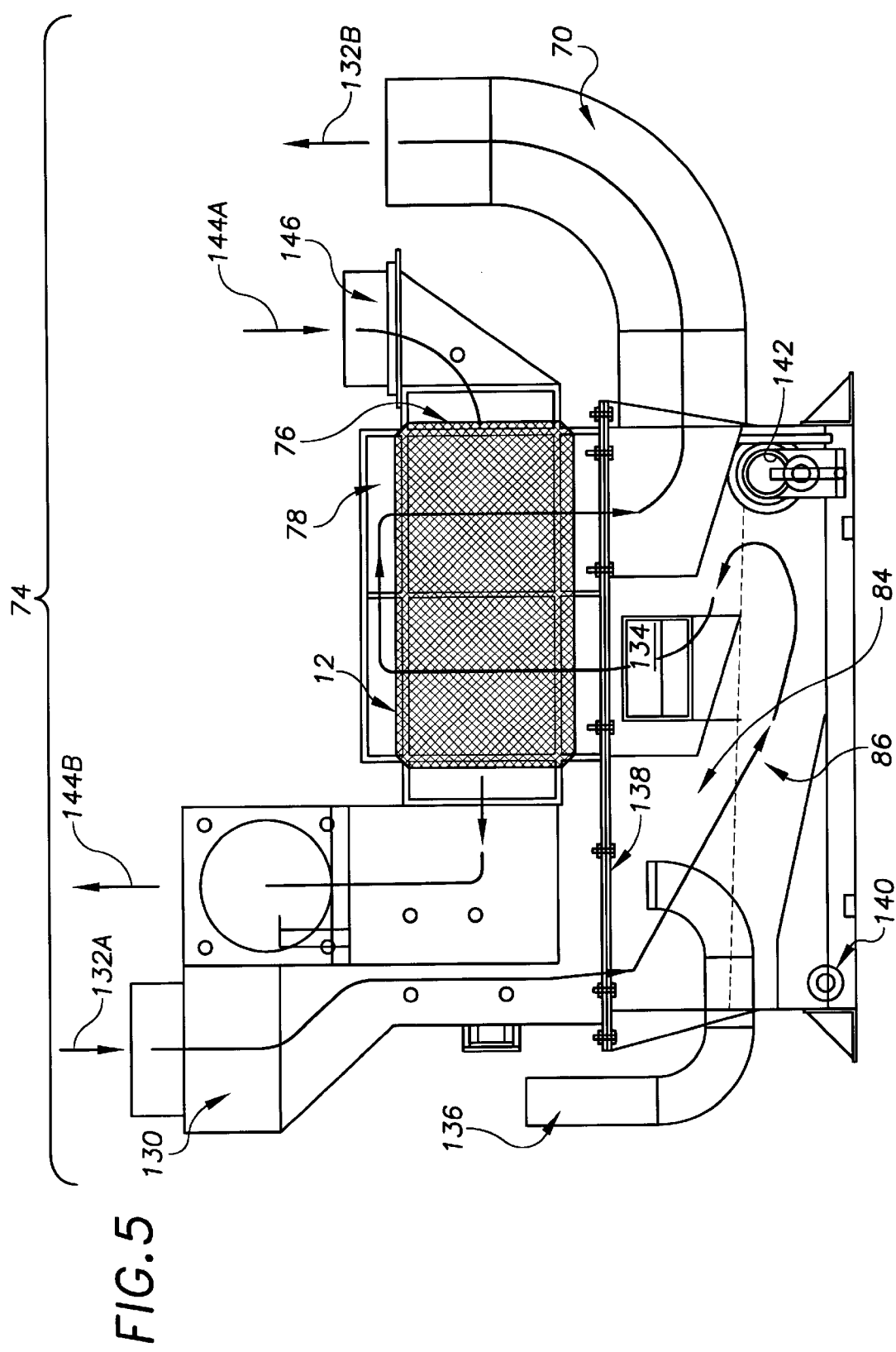
FIG. 5 is a cross-sectional view of a housing including the interdigitated enthalpy exchange device of the present invention disposed with a coolant degasifier and accumulator.

FIG. 5 shows an embodiment of the interdigitated enthalpy exchange device 12, wherein a more elaborate housing 74 of the direct mass and heat transfer device 68 integrates the accumulator 84 and degasifier 86 for the cooling fluid with the process oxidant and plant exhaust streams. The housing 74 includes an exhaust stream manifold 130 that directs flow of the plant exhaust stream, as represented by flow arrows 132A, 132B, from the plant exhaust passage 64 first through the accumulator chamber 84 which also houses the degasifier 86 material, such as a packed bed, or other material well-known in the art for effecting mass transfer between a liquid stream and a gaseous stream, such as the aforesaid packed bed, wetted films, spray towers, etc. It is pointed out that in one embodiment of the present invention, the "plant exhaust stream" may include the cathode exhaust stream exiting the cathode flow field 32 mixed with the combusted anode exhaust stream exiting the burner 40 within the plant exhaust passage 64, and in that embodiment, the plant exhaust stream may be directed into the exhaust stream manifold 130 of the housing. In an alternative embodiment, the plant exhaust passage may direct only the cathode exhaust stream into the exhaust stream manifold, and the combusted anode exhaust line 42 may direct the combusted anode exhaust stream directly into the housing 74 through an anode exhaust inlet opening 134 so that the hot combusted anode exhaust stream mixes with both the cooling fluid in the accumulator chamber 84 and the cathode exhaust stream to cool the anode exhaust gases before being directed by the exhaust stream manifold 130 with the cathode exhaust through the exhaust chamber 78 adjacent the exhaust surface 82 of the interdigitated enthalpy exchange device 12 and then into the plant exhaust vent 70.

The accumulator chamber 84 of the housing 74 also includes a cooling fluid inlet 136 in fluid communication with the coolant diversion line 90 that directs the cooling fluid entering the accumulator chamber 84 to impact a splash plate 138 at upper portion of the accumulator chamber 84 in order to cause the cooling fluid to splash into a shower of droplets before falling into the degasifier 86 material (represented as below the hatched line in the accumulator chamber 84). The accumulator chamber 84 may also include an accumulator egress 140 in fluid communication with the accumulator delivery line 90 for directing cooling fluid back to the coolant loop 48 or coolant plate 34. A level sensor means 142 may also be included within the accumulator chamber 84 for sensing a level of the cooling fluid and selectively directing flow of the cooling fluid back to the coolant loop 48 or to an overflow line (not shown), as is well known in the art.

FIG. 5 also shows flow of the process oxidant stream (as represented by flow arrows 144A, 144B) into and through an oxidant flow manifold 146 in fluid communication with the oxidant inlet line 28 and the oxidant first extension 60 thereof, and that directs the process oxidant stream to pass through the oxidant chamber 76 adjacent the interdigitated process oxidant surface 80 of the enthalpy exchange device 12. Similarly, the exhaust stream manifold 130 also serves to direct flow of the cathode exhaust stream and combusted anode exhaust stream mixed together as a plant exhaust stream from the accumulator chamber 84 into the exhaust chamber 78 to pass adjacent the interdigitated exhaust surface 82 of the interdigitated enthalpy exchange device 12 and then into the plant exhaust vent 70.

In use of the interdigitated fine pore enthalpy exchange device 12 within the described housing 74 having the accumulator chamber 84 including a degasifier 86, dissolved and/or dissociated ammonia ($NH_3$), hydrogen ($H_2$), as well as carbon dioxide ($CO_2$) within the cooling fluid are stripped by the degasifier from the cooling fluid. It is known that these gases react with water in the cooling fluid to form ionic reaction by-products that may increase undesirable conductivity of the cooling fluid. Additionally, water containing as little as 2 parts per million of ammonia may act to displace protons within the PEM electrolyte, and thereby reduce conductivity of the PEM, and hence reduce efficiency of the fuel cell 14. Further, high solubility dissolved gases such as ammonia and carbon dioxide within the cooling fluid may result in gas bubbles interrupting flow in the coolant loop and fuel cell 12, further decreasing fuel cell efficiency. By use of the degasifier 86, the cooling fluid is efficiently and beneficially stripped of these contaminants.

By integrating the combusted anode exhaust stream with the cathode exhaust stream and the cooling fluid within the housing 74, the contaminants are stripped from the cooling fluid, while water and heat from the fuel cell are passed by the interdigitated enthalpy exchange device 12 to efficiently capture and return the water and heat to the fuel cell within the process oxidant stream entering the cell 14. As the plant exhaust stream passes through the exhaust entry and exit channels 112A, 112B, 114A, 114B, because the channels are discontinuous, liquid droplets of cooling fluid and water remain in the exhaust entry channels 112A, 112B, and drop back into the accumulator. Where the cooling fluid is an antifreeze solution, liquid antifreeze solution is therefore retained within the power plant 10. It is an important aspect of this invention that the just described action of the exhaust entry channels 112A, 112B capturing liquid cooling fluid and water also serves to re-supply liquid transfer medium to the fine pore exhaust body 108, and through the fine pore exhaust body 108 to the adjacent fine pore process oxidant body 94 as the liquid flows to fill pores of the support matrix making up the process oxidant and exhaust bodies 94, 108. By such an arrangement, the interdigitated enthalpy exchange device 12 remains automatically saturated to enhance its performance. That is particularly important when the liquid transfer medium and the cooling fluid are the same antifreeze solution that therefore automatically restricts freezing of the device 12, while maintaining it at an efficient level of operation.

As the process oxidant stream passes through the discontinuous process oxidant entry and exit channels 98A, 98B,

98C, 100A, 100B, 100C, dust particles are unable to pass through the process oxidant large pore media 104 thereby restricting passage of the dust particles into the fuel cell 14. During operation of the power plant 10, noise generated by the blower 72 may pass trough the process oxidant stream within the first extension 60 of the oxidant inlet line to the direct mass and heat transfer device 68. However, because the process oxidant exit channels 100A, 100B, 100C of the interdigitated process oxidant surface 80 of the enthalpy exchange device 12 are discontinuous with the process oxidant entry channels 98A, 98B, 98C, sound waves in the process exhaust stream may not pass directly through the process oxidant stream, and consequently the fine pore process oxidant body 94 will serve to dampen the sound waves. The interdigitated enthalpy exchange device 12 therefore serves to accomplish several direct, beneficial goals, and when integrated in a common housing with the coolant accumulator chamber 84 and degasifier 86, the device 12 cooperates within the housing to provide for a substantial enhancement of efficient operation of the fuel cell power plant 10.

While the present invention has been described and illustrated with respect to particular embodiments and methods of use of an interdigitated enthalpy exchange device 12 for a fuel cell power plant 10, it is to be understood that the present invention is not to be limited to the described and illustrated embodiment. For example, although the interdigitated enthalpy exchange device 12 for a fuel cell power plant 10 of the present invention has been primarily described in the context of a "PEM" fuel cell, the device 12 is applicable to other fuel cells utilizing other solid polymer or aqueous electrolytes. Further, FIG. 1 shows schematically a direct mass and heat transfer device 68 securing one interdigitated enthalpy exchange device 12 between process oxidant and plant exhaust streams. The invention, however, also includes a plurality of the devices 12 secured in a manner appropriate to efficiently transfer necessary water and heat from the plant exhaust to the process oxidant stream, depending upon operational requirements of the plant 10. Accordingly, reference should be made primarily to the following claims rather than the foregoing description to determine the scope of the invention.

What is claimed is:

1. A fuel cell power plant that generates electrical energy from process oxidant and reducing fluid reactant streams, the plant comprising:
   a. at least one fuel cell means for producing the electrical energy from the process oxidant stream and reducing fluid stream; and,
   b. a direct mass and heat transfer device secured in fluid communication with both an oxidant inlet line that directs the process oxidant stream into the fuel cell means and also with a plant exhaust passage that directs a plant exhaust stream out of the fuel cell means, the device including a housing that secures an interdigitated enthalpy exchange device means for transferring mass and heat between the plant exhaust stream passing adjacent an exhaust surface of the device means and the process oxidant stream passing adjacent an opposed process oxidant surface of the device means, wherein the housing secures the device means between the oxidant and exhaust streams to prevent bulk mixing of the streams within the device.

2. The fuel cell power plant of claim 1, wherein the interdigitated enthalpy exchange device means includes a fine pore process oxidant body having a process oxidant barrier surface opposed to an interdigitated process oxidant surface, the interdigitated process oxidant surface including at least one process oxidant entry channel in fluid communication with the oxidant inlet line, at least one process oxidant exit channel that is discontinuous with the process oxidant entry channel and is in fluid communication with an extension of the oxidant inlet line directing the process oxidant stream into the fuel cell means, and a process oxidant large pore media secured adjacent to the interdigitated process oxidant surface and dimensioned to overlie the process oxidant entry and exit channels.

3. The fuel cell power plant of claim 1, wherein the interdigitated enthalpy exchange device means includes a fine pore exhaust body having an exhaust barrier surface opposed to an interdigitated exhaust surface, the interdigitated exhaust surface including at least one exhaust entry channel in fluid communication with the plant exhaust passage, at least one exhaust exit channel that is discontinuous with the exhaust entry channel, and an exhaust large pore media secured adjacent to the interdigitated exhaust surface and dimensioned to overlie the exhaust entry and exit channels.

4. The fuel cell power plant of claim 1, wherein the interdigitated enthalpy exchange device means includes at least one fine pore body including a support matrix means for defining pores having a pore size of less than 20 microns for supporting a liquid transfer medium that fills the pores and for being chemically stable in the presence of the liquid transfer medium, so that whenever the liquid transfer medium fills the pores the fine pore body has a bubble pressure greater than 0.2 pounds per square inch, and the device means includes at least one large pore media secured adjacent an interdigitated surface of the fine pore body, the large pore media having a pore size range of greater than 20 microns.

5. The fuel cell power plant of claim 4, wherein the fine pore body is hydrophilic, and the large pore media is hydrophobic.

6. The fuel cell power plant of claim 1, wherein the direct mass and heat transfer device housing includes a coolant accumulator chamber in fluid communication with a coolant stream passing through the fuel cell means, the housing also including an exhaust stream manifold secured in fluid communication between the plant exhaust passage and the interdigitated enthalpy exchange device means that directs the plant exhaust stream through the coolant accumulator chamber and into the device means.

7. The fuel cell power plant of claim 6, wherein the direct mass and heat transfer device housing includes a degasifier means for stripping contaminants from the coolant stream, wherein the degasifier is in fluid communication with the coolant stream within the coolant accumulator chamber.

8. The fuel cell power plant of claim 1, wherein a combusted anode exhaust line directs a combusted anode exhaust stream exiting a burner in fluid communication with an anode flow field of the fuel cell means from the burner into fluid communication with the plant exhaust stream passing adjacent the exhaust surface of the interdigitated enthalpy exchange device means.

9. A fuel cell power plant that generates electrical energy from process oxidant and reducing fluid reactant streams, the plant comprising:
   a. at least one fuel cell means for producing the electrical energy from the process oxidant stream and reducing fluid stream; and,
   b. a direct mass and heat transfer device secured in fluid communication with both an oxidant inlet line that directs the process oxidant stream into the fuel cell means and also with a plant exhaust passage that directs a plant exhaust stream out of the fuel cell means, the device including a housing that secures an interdigitated enthalpy exchange device means for transferring mass and heat between the plant exhaust stream passing adjacent an exhaust surface of the device means and the process oxidant stream passing adjacent an opposed process oxidant surface of the device means, wherein the housing secures the device means between the oxidant and exhaust streams to prevent bulk mixing of the streams within the device, and wherein the device means includes at least one fine pore body having a hydrophilic support matrix means for defining pores having a pore size of less than 20 microns for supporting a liquid transfer medium that fills the pores and for being chemically stable in the presence of the liquid transfer medium, so that whenever the liquid transfer medium fills the pores the fine pore body has a bubble pressure greater than 0.2 pounds per square inch, and the device means includes at least one large pore media secured adjacent an interdigitated surface of the fine pore body, the large pore media having a pore size range of greater than 20 microns.

10. The fuel cell power plant of claim 9 wherein the direct mass and heat transfer device housing includes a coolant accumulator chamber in fluid communication with a coolant stream passing through the fuel cell means, the housing also including an exhaust stream manifold secured in fluid communication between the plant exhaust passage and the interdigitated enthalpy exchange device means that directs the plant exhaust stream through the coolant accumulator chamber and into the device means.

11. The fuel cell power plant of claim 10, wherein the direct mass and heat transfer device housing includes a degasifier means for stripping contaminants from the coolant stream, wherein the degasifier is in fluid communication with the coolant stream within the coolant accumulator chamber.

12. The fuel cell power plant of claim 11, wherein a combusted anode exhaust line directs a combusted anode exhaust stream exiting a burner in fluid communication with an anode flow field of the fuel cell means from the burner into fluid communication with the plant exhaust stream passing through the coolant accumulator chamber.

13. The fuel cell power plant of claim 9, wherein the support matrix means comprises a support matrix selected from the group consisting of: a. a porous, graphite layer; b. a porous graphite-polymer layer; c. an inorganic-fiber, thermoset polymer layer; d. a glass-fiber layer; e. a synthetic-fiber, filter-paper layer treated to be hydrophilic; f. a porous metal layer; and, g. a plurality of layers of the group.

14. The fuel cell power plant of claim 13, wherein the liquid transfer medium is an organic antifreeze solution having a freezing point of less than 0° F.

15. The fuel cell power plant of claim 10, wherein the liquid transfer medium and the coolant stream are a 45 to 80 weight per cent glycerol solution.

16. The fuel cell power plant of claim 9, wherein the fine pore body is a fine pore process oxidant body having a process oxidant barrier surface opposed to an interdigitated process oxidant surface, and having a process oxidant large pore media secured adjacent to the interdigitated process oxidant surface and dimensioned to overlie discontinuous process oxidant entry and process oxidant exit channels defined in the interdigitated process oxidant surface, the device means also including a fine pore exhaust body adjacent the fine pore process oxidant body having an exhaust barrier surface opposed to an interdigitated exhaust surface, and having an exhaust large pore media secured adjacent to the interdigitated exhaust surface and dimensioned to overlie discontinuous exhaust entry and exhaust exit channels defined in the interdigitated exhaust surface.

17. A method of exchanging mass and heat from a plant exhaust stream leaving a fuel cell power plant into a process oxidant stream entering a fuel cell of the fuel cell power plant, comprising the steps of:

a. securing an interdigitated fine pore enthalpy exchange device between an exhaust chamber and an oxidant chamber of a housing of a direct mass and heat transfer device so that whenever a liquid transfer medium wets pores defined within a support matrix of the enthalpy exchange device, the device restricts bulk mixing of fluids between the exhaust and oxidant chambers;

b. passing the plant exhaust stream through at least one exhaust entry channel defined in an exhaust surface of the enthalpy exchange device, then through an exhaust large pore media adjacent the exhaust surface, and then through at least one exhaust exit channel defined in the exhaust surface of the enthalpy exchange device;

c. passing the process oxidant stream through at least one process oxidant entry channel defined in a process oxidant surface of the enthalpy exchange device, then through a process oxidant large pore media adjacent the process oxidant surface, and then through at least one process oxidant exit channel defined in the process oxidant surface of the enthalpy exchange device; and, d. then directing the process oxidant stream from the direct mass and heat transfer device to pass adjacent a cathode electrode of the fuel cell.

18. The method of claim 17, comprising the further steps of directing a coolant stream from the fuel cell to pass within a coolant accumulator chamber of the housing of the direct mass and heat transfer device, and directing the process exhaust stream to also pass within the coolant accumulator chamber to mix with the coolant stream before passing the process exhaust stream through the exhaust entry channel in the exhaust surface of the interdigitated enthalpy exchange device.

19. The method of claim 18, comprising the further steps of directing the coolant stream and the process exhaust stream to pass through a degasifier in fluid communication with the coolant stream within the coolant accumulator chamber before passing the process exhaust stream through the exhaust entry channel in the exhaust surface of the interdigitated enthalpy exchange device.

20. The method of claim 19, comprising the further step of passing a combusted anode exhaust stream from a burner in fluid communication with an anode flow field of the fuel cell from the burner into fluid communication with the plant exhaust stream passing through the coolant accumulator chamber.

* * * * *